United States Patent [19]

Mikalonis

[11] Patent Number: 5,006,966
[45] Date of Patent: Apr. 9, 1991

[54] TRANSIT VEHICLE LIGHTING FIXTURE

[75] Inventor: Liudas K. Mikalonis, Northville, Mich.

[73] Assignee: Transmatic, Inc., Waterford, Mich.

[21] Appl. No.: 400,426

[22] Filed: Aug. 30, 1989

[51] Int. Cl.⁵ .............................................. B60Q 3/00
[52] U.S. Cl. .................................... 362/74; 362/224; 362/235; 362/310; 362/362
[58] Field of Search ................. 362/33, 61, 74, 217, 362/223, 224, 235, 297, 307, 308, 310, 362

[56] References Cited

U.S. PATENT DOCUMENTS

| | | | |
|---|---|---|---|
| 2,102,944 | 12/1937 | Doane | 362/74 |
| 2,250,954 | 7/1941 | Hagerty et al. | 362/74 |
| 4,260,220 | 4/1981 | Whitehead | 350/96.28 |
| 4,387,415 | 6/1983 | Domas | 362/74 |
| 4,574,336 | 3/1986 | Mikalonis | 362/260 |
| 4,615,579 | 10/1986 | Whitehead | 350/96.1 |

OTHER PUBLICATIONS

3M Scotch Optical Lighting Film-General Theory, Nov. 1988.

Primary Examiner—Stephen F. Husar
Attorney, Agent, or Firm—Reising, Ethington, Barnard, Perry & Milton

[57] ABSTRACT

An elongated cornice lighting fixture in a public transit vehicle coupled with an advertising display panel is mounted above the windows on each side of the vehicle. Light from incandescent bulbs in each fixture is controlled by sheets of reflective optical film to direct the light to the seating area below each fixture and to the display panel associated with the opposite fixture with only minimal illumination of the vehicle floor and windows.

5 Claims, 2 Drawing Sheets

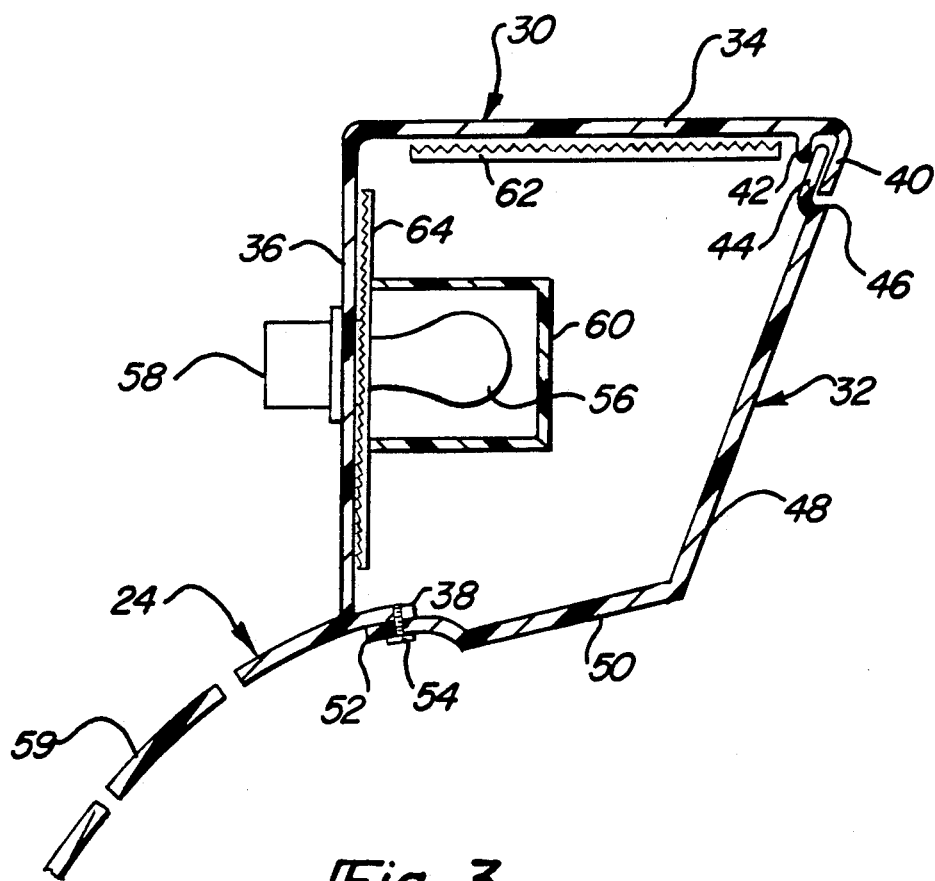
_Fig-3_
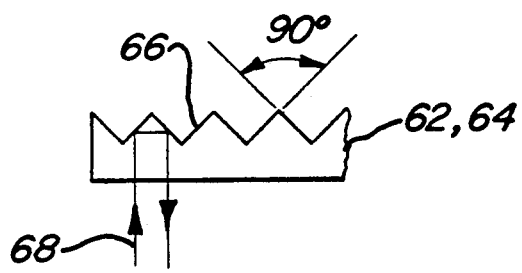
_Fig-4_

TRANSIT VEHICLE LIGHTING FIXTURE

FIELD OF THE INVENTION

This invention relates to interior vehicle lighting and particularly to a lighting fixture arrangement for a public transit vehicle.

BACKGROUND OF THE INVENTION

My patent U.S. Pat. No. 4,574,336 and the patent to Domas U.S. Pat. No. 4,387,415 show cornice lighting fixtures that are used in public transit vehicles. They include an elongated display panel for holding advertising cards and an integral lamp housing made in long pieces for mounting longitudinally above the vehicle side windows and over the passenger seats. A translucent cover completes the housing and fluorescent tubes in the housing provide the light source. Inverter ballasts provide the necessary voltage and regulation for the fluorescent lamps. These devices are expensive to install and require maintenance. Thus it is desirable to replace the fluorescent lighting system.

This lighting arrangement supplies sufficient illumination to the region directly below the fixtures to meet governmentally mandated light levels in the seating area and also casts light across the aisle to illuminate the advertising cards on the opposite side of the vehicle. Incidental to this lighting pattern, the fixtures illuminate the aisle floor and side windows as well. The side window illumination is unnecessary and tends to hamper passenger night vision through the window. The lighting of the aisle floor is also unnecessary and tends to reflect onto the vehicle windshield. It is thus expected that both passenger and operator night vision can be enhanced by controlling the light from the fixtures into selected light patterns which significantly reduce the light level incident on the side windows and on the floor of the aisle.

A commercially available optical sheet material has been marketed for use with high intensity incandescent lamps as a substitute for fluorescent tubes. The material is explained in the patents to Whitehead, U.S. Pat. No. 4,260,220 and U.S. Pat. No. 4,615,579. The material is a transparent and reflective sheet and, when fashioned into a tube, serves as a hollow light guide to provide controlled illumination pattern from a lamp provided at its end. It is my proposal to use this material in a different configuration along with incandescent lamps in the lighting fixtures to provide the desired light patterns for a public transit vehicle.

SUMMARY OF THE INVENTION

It is therefore an object of the invention to provide a lighting fixture for a transit vehicle which avoids the use of fluorescent tubes and which provides directed light patterns for enhanced illumination.

The invention is carried out by using the aforementioned light fixtures modified to replace the fluorescent tubes with high intensity incandescent lamps in conjunction with optical elements to direct the light over a large area in the manner of a fluorescent tube but controlled to define a desired pattern of illumination.

BRIEF DESCRIPTION OF THE DRAWINGS

The above and other advantages of the invention will become more apparent from the following description taken in conjunction with the accompanying drawings wherein like references refer to like parts and wherein:

FIG. 3 is a cross-sectional detail view of a lighting fixture according to the invention; and FIG. 4 is a detail view of an optical film used in the fixture of FIG. 3.

DESCRIPTION OF THE INVENTION

Figure 1:
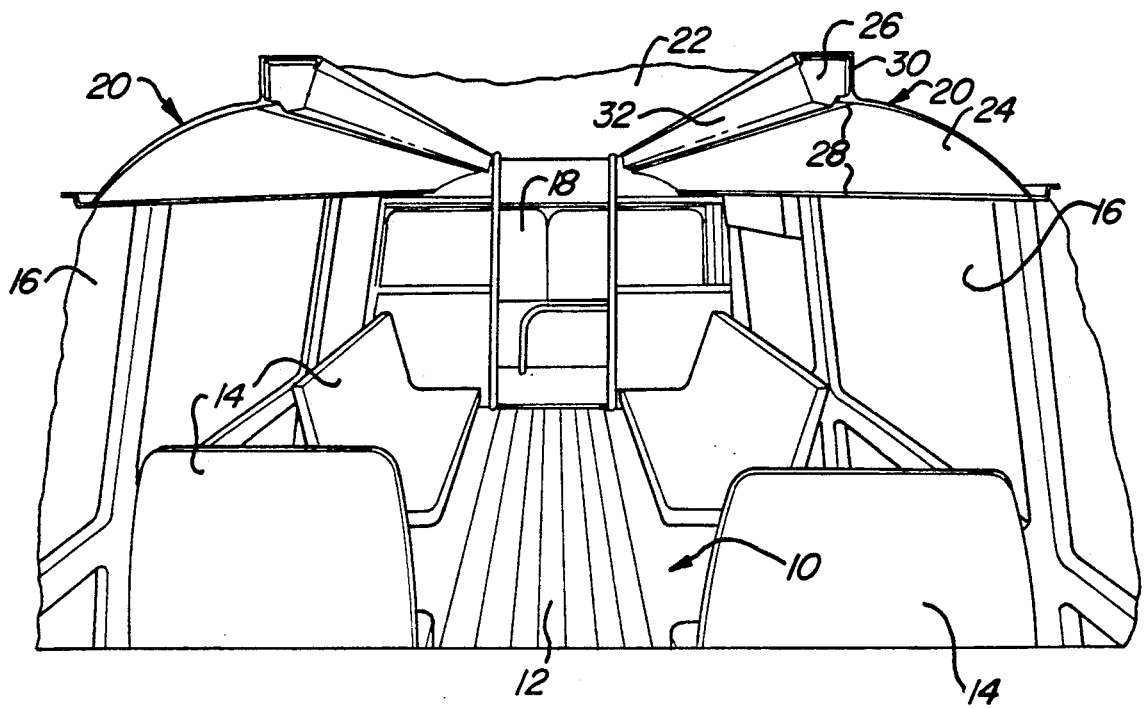
FIG. 1 is a perspective view of a vehicle interior having light fixtures according to the invention.

As shown in FIG. 1, the interior of a transit vehicle includes a floor 10 affording a center aisle 12 running longitudinally of the vehicle and supporting spaced sets of seats 14 bounded by side windows 16. Other windows comprise the front windshield 18. Combination display panels and light fixtures 20 are mounted above the side windows 16 and secured to the inside of the vehicle roof 22. The combination display panel and light fixture 20 includes a gently rounded display panel 24 positioned directly above the windows and a light fixture 26 located directly above the seats 14. The display area is bounded by upper and lower flanges 28 for holding advertising cards. The housing 30 of the light fixture and the display panel 24 are one piece formed preferably by pultrusion and are several feet long, even long enough to extend the length of the vehicle interior. Covers 32 over the light fixture housing 30 enclose lamps and are made of translucent material to transmit the light from the lamps. The cover material is formed of polycarbonate and may be either transparent or translucent white. Transparent material can have flutes or prisms to direct the light whereas white translucent material diffuses the light. With the exception of the fixture details described below, the fixture is described in the patent to Domas U.S. Pat. No. 4,387,415, which is incorporated herein by reference.

Figure 2:
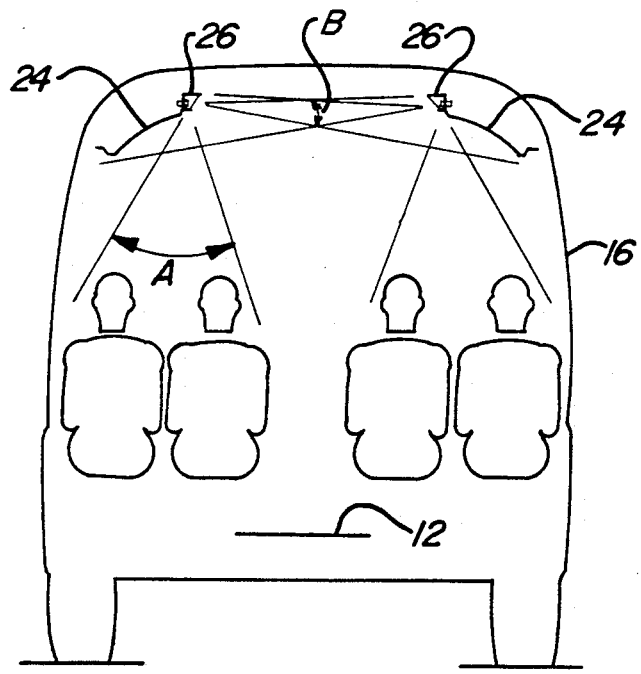
FIG. 2 is a cross-sectional view of a vehicle schematically showing the lighting pattern from the fixtures according to the invention.

The fixture 26 is equipped with lamps and an optical arrangement to direct light to the seating area at required light levels which enable passengers to read while allowing only minor amounts of illumination of the aisle 12 and the side windows 16. As shown in FIG. 2 the light pattern is concentrated within angle A. This minimizes the light reflected onto the windshield 18 and also minimizes the interference with vision through the side windows. Each fixture also directs a second pattern of light through angle B to illuminate the display area 24 on the opposite side of the aisle. This pattern is concentrated on the display area and only minimal illumination of the side windows occurs.

The fixture 26 and a portion of the contiguous display panel 24 are shown in cross-section in FIG. 3. The housing 30 has an upper horizontal portion 34 and a vertical side portion 36. The lower part of the side portion 36 joins with the display panel 24 and also has an inwardly turned flange 38. The upper portion 34 terminates in a face flange 40 and a hidden flange 42 that cooperatively define a groove for receiving an upper edge 44 of the cover 32. On ogee shape 46 extruded in the light cover 32 adjacent the upper edge thereof provides a flush condition of the cover with the face flange 40. The cover has an inclined front face 48 and a generally horizontal lower face 50 which terminates in a lip 52 which is attached to the flange 38 by screw fasteners 54.

A plurality of incandescent high intensity lamps 56 are spaced along the fixture and are mounted in sockets 58 which are attached to the rear of the side portion 36 of the housing and the lamp extends through an aperture in the side portion 36. A removable or hinged access panel 59 for each lamp is provided in the display panel 24 to facilitate servicing. A diffuser 60 secured to the side portion partially surrounds the lamp 56 to allow moderate lighting to the cover 32 in the immediate neighborhood of the lamp so that neither a dark spot or a bright spot will appear in the cover. An optical arrangement comprising sheets of optical film is used to direct the light from each lamp to the preferred lighting areas. The sheets of optical film 62 and 64 are applied to the inner surfaces of the upper portion 34 and the side portion 36 respectively, and extend longitudinally of the vehicle.

The optical film is available as 3M Scotch (TM) optical lighting film and is described in the patents to Whitehead, U.S. Pat. No. 4,260,220 and U.S. Pat. No. 4,615,579, which are incorporated herein by reference. The film is a transparent plastic such as optical grade acrylic or polycarbonate about 0.2 inch thick and having a smooth surface on one side and prism shaped grooves on the other side. As shown in section in FIG. 4, the grooves 66 define 90 degree prism angles and are suited to reflect a light ray 68 entering the film from the smooth side. The film redirects the reflected rays such that the emanating light pattern tends to be compressed rather than expanded like a conventional plane mirror would do. The reflection is possible only for rays 68 which are incident on the film at a shallow angle. The ray 68 shown in FIG. 4 is at a shallow angle to the film and thus does not lie in the plane of the paper. Specifically, light rays emanating from a source in a cone less than 27.6 degrees from an axis parallel to the film grooves are totally internally reflected by the film and thus are redirected to pass through the cover.

The optical film sheets 62, 64 are mounted with the grooves extending longitudinally of the vehicle. The optical reflecting film 62 on the upper surface of the housing 30 thus reflects light from the lamps 56 through the angle A toward the seats 14. If the diffuser 60 does not cover the area between the lamp and the adjacent film, the film portion nearest a lamp may be too close to lie within the cone of reflected light so that only the optical film further from the lamp would be effective to form the desired light pattern in angle A. The light from the diffuser 60 would tend to fill in to prevent a dark space and the directed light from other lamps will also fill in. In another embodiment, by forming the diffuser to intercept the light directed toward the film, some of the light will be diffused and redirected at a small angle to the regioin of the film 62 adjacent to the light so that it can be reflected into the angle A region to enhance the seat lighting. In the same way, the optical reflecting file 64 on the side surface of the housing 30 directs light from the lamps 56 into the angle B to illuminate the display panel 24 across the aisle.

It will thus be seen that by modifying the production light fixtures for public transit vehicles by incorporating incandescent lamps and commercially available optical film, the fluorescent tubes and associated inverter ballasts can be eliminated and at the same time, improved control of the lighting is obtained to enhance driver and passenger vision.

The embodiments of the invention in which an exclusive proeprty or privilege is claimed are defined as follows:

1. In a public transit vehicle having side windows, an aisle extending along the longitudinal axis of the vehicle and a passenger seating area on either side of the aisle, a lighting fixture arrangement for preferentially illuminating the seating area and minimizing the illumination of the aisle and side windows, comprising:
    a lighting fixture above each passenger seating area,
    each fixture having an elongated light housing extending generally parallel to the aisle, the housing comprising an upper surface, an adjacent side surface, and a translucent cover having a side wall spaced from the said side surface and a bottom wall spaced from the upper surface to define a cavity,
    a plurality of spaced incandescent lamps within the housing, and
    optical means positioned in the housing adjacent each lamp to receive light from the adjacent lamp for preferentially directing light from the lamps through the bottom wall of the translucent cover to the seating area, whereby the seating area is illuminated at a higher level than the aisle and the side windows.

2. The invention as defined in claim 1 wherein the optical means adjacent each lamp comprises a reflective panel of transparent material having grooves on the side opposite the incident light from the lamp for reflecting the light in a controlled pattern to selectively illuminate the seating area.

3. The invention as defined in claim 1 wherein an elongated display area is disposed above the windows adjacent each fixture and wherein,
    each fixture has within its housing second optical means adjacent each lamp to receive light from the adjacent lamp for preferentially directing light from the lamps through the side wall of the translucent cover to the display area on the other side of the aisle, whereby the display area is illuminated at a higher level than the windows.

4. The invention as defined in claim 3 wherein the second optical means adjacent each lamp comprises a reflective panel of transparent material having grooves on the side opposite the incident light from the lamp for reflecting the light in a controlled pattern to selectively illuminate the display area.

5. The invention as defined in claim 3 wherein the optical means and the second optical means are respectively mounted on the upper surface and the side surface of the housing.

* * * * *